United States Patent [19]
Hubert et al.

[11] 3,928,642
[45] Dec. 23, 1975

[54] PROCESS FOR LYSING MYCELIAL WASTE
[75] Inventors: Alfred W. Hubert, West Lafayette; Ralph T. Russell, Lafayette, both of Ind.
[73] Assignee: Eli Lilly and Company, Indianapolis, Ind.
[22] Filed: Jan. 22, 1975
[21] Appl. No.: 542,990

[52] U.S. Cl. ................ 426/521; 426/520; 426/648
[51] Int. Cl.² ........................................ A23K 1/00
[58] Field of Search .................... 426/204, 520, 521

[56] References Cited
UNITED STATES PATENTS
3,840,658   10/1974   Abe et al. ...................... 426/204 X Primary Examiner—James R. Hoffman
Attorney, Agent, or Firm—William E. Maycock; Everet F. Smith

[57] ABSTRACT

Mycelial waste is lysed by subjecting the waste to a temperature of from about 140° to about 200°C. at a pressure of from the equilibrium pressure to about 2,000 p.s.i.g., and at a pH of from about 2 to about 10. The lysed mycelial waste is useful as an animal feed supplement.

8 Claims, No Drawings

PROCESS FOR LYSING MYCELIAL WASTE

BACKGROUND OF THE INVENTION

This invention relates to a process for lysing mycelial waste. More particularly, this invention relates to a process for lysing mycelial waste, which process employs high temperature in combination with pressure.

Antibiotics are a diverse group of chemical compounds which are capable of inhibiting the growth of, or destroying, various microorganisms. With few exceptions, antibiotics are produced by fermentation. Examples of the more common antibiotics include, among others, aterrimin, amphotericin B, bacitracin, benzylpenicillin, cephalosporin C, chlortetracycline, 7-chloro-6-demethyltetracycline, cycloheximide, dihydrostreptomycin, erythromycin, fumagillin, gramicidin, hygromycin, kanamycin, neomycin, novobiocin, nystatin, oleandomycin, oxamycin, oxytetracycline, paromomycin, phenoxymethylpenicillin, polymyxin, ristocetin, streptomycin, tetracycline, tiostrepton, tylosin, tyrocidin, vancomycin, and viomycin.

During the manufacturing process, the antibiotic can accumulate within the cells of the microorganism or be excreted into the aqueous fermentation broth, or both. Recovery of the antibiotic typically first involves a filtration step to give a filter cake, commonly referred to by the term "mycelial cake," and filtrate, commonly referred to as "beer" or "fermentation beer." The mycelial cake consists essentially of the microorganism, i.e., mycelia, and excess insoluble nutrients. In some cases, a filter aid also may be present. Next, the mycelial cake and/or fermentation beer are further processed by such means as solvent extraction, selective ion exchange chromatography, precipitation techniques, or some combination thereof. After processing, the fermentation beer is referred to as "spent beer."

Alternatively, the antibiotic can be recovered from the aqueous fermentation broth by an azeotropic distillation procedure. Briefly, an organic solvent which forms an appropriate azeotrope with water is added to the aqueous fermentation broth. The resulting mixture is subjected to azeotropic distillation to remove all or part of the water from the broth, leaving a mixture comprising organic solvent and insoluble material, wherein the antibiotic is in solution in the organic solvent. The insoluble portion can be separated by suitable means, such as filtration or centrifugation. Such insoluble portion, i.e., azeotropic distillation process solids, consists essentially of the microorganism, i.e., mycelia, excess water-insoluble nutrients excess water-soluble nutrients, and inorganic salts.

The term "mycelial waste," as used herein, is meant to include both mycelial cake and azeotropic distillation process solids. Furthermore, such term is meant to include such cake and solids without regard to physical form. That is, such term includes such cake and solids, per se, or slurries of such cake and solids in water, spend beer, or other aqueous media. In its broadest sense, the term "mycelial waste" is meant to include any mycelia-containing by-product, in whatever form, from antibiotic production.

It is well known to convert aqueous fermentation broth to a solid product by the removal of water and to employ the dried product as an animal feed additive. However, such an additive is empolyed primarily for the purpose of utilizing the antibiotic activity of the product, typically as a growth regulator or growth promotor. In those instances where it is desired to obtain the antibiotic separate from the fermentation broth, disposal problems relative to mycelial waste and spent beer arise. The spent beer usually can be treated in the same manner as other plant effluent. However, the mycelial waste is not readily disposed of. Often, such waste is either burned or buried in landfills. Such procedures obviously add to the over-all manufacturing cost of an antibiotic, not to mention the adverse environmental impact of such procedures.

Mycelial waste also can be processed readily to a dried product, useful as an animal feed supplement, in order to take advantage of the inherent nutrient value to animals of such waste. However, such product contains some antibiotic activity which presents marketing problems. It is difficult to thermally decompose the antibiotic in such product because of handling and scorching problems. While the scorching problems can be avoided by heating the product by means of steam injection, water is added which then must be removed, thereby adding to processing costs.

Frequently, it is desired to market mycelial waste as a flowable or pumpable slurry, again for use as an animal feed supplement. In addition to the problem of antibiotic activity already mentioned, substantial handling problems are present. In general, a slurry of mycelial waste having a solids content in excess of about ten percent cannot be prepared without gelling. Obviously, marketing such a slurry will greatly increase shipping and handling costs per unit weight of dry mycelial waste. The economic production and marketing of a mycelial waste slurry requires a slurry solids content in excess of about 20 percent, and preferably of the order of about 30 percent or higher. Such levels of solids have not heretofor been attainable.

It is known that lysing microorganisms often can result in an ability to obtain a slurry having increased solids content. However, many of the microorganisms employed to produce antibiotics are resistant to typical lysing techniques, such as shearing, sonic cavitation, strong acid at 100°C., strong base at 100°C., and enzymatic methods. Specific examples of some attempts to utilize these known lysing techniques include, by way of illustration, heating the organism at 90°C. in aqueous solution at a pH of 1.0 for 2 hours; heating at the same temperature under similar conditions but at a pH of 10.0; heating at the same temperature in 5% aqueous sodium hydroxide; heating at the same temperature in 5% aqueous sulfuric acid; mechanical shearing in a blender; and treatment with such enzymes as amylases and proteases.

SUMMARY OF THE INVENTION

In accordance with the present invention, antibiotic-producing microorganisms are lysed by the process which comprises heating the mycelial waste in the presence of water at a temperature of from about 140° to about 200°C or higher and at a pressure from the equilibrium pressure to about 2,000 p.s.i.g., and at a pH of from about 2 to about 10, until substantially no antibiotic activity remains. Treatment times can vary from about 10 minutes to about 5 hours or longer. The treated waste then is concentrated and/or dried by known procedures.

The lysis procedure of the present invention permits the preparation of a slurry which still is flowable or pumpable, yet which has a solids content of up to about 30%. Furthermore, the process destroys antibiotic activity, which destruction is necessary in order to market the lysed mycelial waste solely for its nutrient value in animal feeds.

DETAILED DESCRIPTION OF THE INVENTION

The process of the present invention is carried out using mycelial waste, e.g., mycelial cake, a mixture of mycelial cake and spent beer, a mixture of mycelial cake and water, or any combination thereof, and can be either a batch process or a continuous process. It will be recognized by those skilled in the art that the choice of batch versus continuous process to some extent will be dependent upon the nature of the material to be lysed. For example, lysis of mycelial cake along typically will be carried out as a batch process using an autoclave. Regardless of whether a process is batch or continuous, standard prior art equipment and procedures are employed. For example, heating can be achieved by any known means, such as electrical heating, heat exchange medium, and steam injection.

While mycelial cake alone can be employed in the process of the present invention, it is preferred to employ a slurry of mycelial waste, such as, for instance, mycelial cake slurried in spent beer and/or water. This permits carrying out the process on a continuous base.

In general, the solids content of the mycelial waste to be lysed can vary from about 1 to about 30 percent. For example, if the material to be lysed consists of mycelial cake, the solids content will be of the order of about 30 percent. If a slurry of mycelial waste is employed, the solids content typically will vary from about 1 to about 15 percent. Normally, the solids content of the slurry will be in the range of from about 5 to about 10 percent, which mixture typically is obtained by combining mycelial cake with spent beer to approximately the same solids content as was present in the original fermentation broth.

In general, the pH of the mycelial waste to be lyzed in accordance with the process of the present invention is the natural pH of the mycelial waste slurry or of the mycelial cake. In the preferred case wherein a slurry of mycelial waste and spent beer is employed, the pH typically will be in the range of from about 5 to about 7. However, the pH can vary from about 2 to about 10. Where the microorganism is difficult to lyse or where the antibiotic is resistent to hydrolytic destruction, the addition of base can be carried out to either more rapidly or more completely destroy antibiotic activity. However, the addition of base generally is not preferred and usually is not necessary.

The process in general is carried out at a temperature of from about 140° to about 200°C. or higher. the preferred temperature range is from about 150° to about 200°C., with the most preferred temperature range being from about 160° to about 200°C.

Residence times typically can vary from about ten minutes to about five hours or longer. However, residence times of from about ten minutes to about three hours are preferred, with a residence time of about one hour being most preferred. Of course, the residence time is not critical, provided that such residence time is long enough to achieve the desired degree of lysis, and that heating is carried out until substantially no antibiotic activity remains. Furthermore, the residence time is to a large degree dependent upon the temperature employed in the lysis process. It will be apparent to those skilled in the art that optimum conditions can be determined readily for any given microorganism, or combination of microorganisms.

Ther term "residence time," as used herein, refers to the time for which the mixture to be lysed is heated at the desired tmperature. Understandably, excessively-long heat-up times will effect the course of lysis to the extent that reduced residence times can be tolerated. In the case of a continuous process, the problem of heat-up can be controlled by pre-heating the mycelial waste slurry to be lysed prior to charging to the continuous reactor.

In general, antibiotic activity is determined by methods well known to those skilled in the art, such as bioassay by plate method and bioautographic assay. Typically, antibiotic activities by the plate method bioassay are considered to be negative if less than about 100 micrograms per gram (mcg./g.), at which values the bioautographic assay generally is negative.

As indicated hereinbefore, the process is carried out at a pressure which can vary from equilibrium pressure to about 2000 p.s.i.g. The term "equilibrium pressure," as used herein, means that pressure which develops normally from heating the mixture to be lysed under conditions of constant volume. In situations where heating is carried out electrically, such pressure will be due to the vapor pressure of the mixture at the residence temperature. In situations where heating is achieved by steam injection, which is the preferred method of heating, the pressure is that which develops from the equilibrium achieved between the steam injection and the lysis mixture. That is, there probably is some contribution to pressure from the lysis mixture and also from the steam which is injected under pressure. Typically, steam injection will result in an equilibrium pressure relatively close to the vapor pressure of water at the residence temperature.

Of course, the process can be carried out employing a pressure other than equilibrium pressure. Such pressure in general will be below about 2000 p.s.i.g., and is readily achieved by known means. The most common method is to pressurize the reaction vessel with an inert gas, such as nitrogen, to the desired pressure prior to heating or after heating to the desired temperature in the case of a batch process, or during the course of the lysis in a continuous process.

By way of illustration only, a typical continuous lysis procedure according to the process of the present invention, combined with concentration and drying operations, is carried out as follows: mycelial waste and spent beer are charged to a mixing tank to give a solids content of about 8–10 percent by weight. The material is pumped through a heat exchanger in order to preheat the slurry to the lysis temperature. The mixture then passes to the lysis reactor for the selected residence time. The lyzed slurry then is transferred from the lysis reactor through a heat exchanger to a multiple effect evaporator which results in the concentration of the lysis slurry to a lyzed slurry containing about 30 percent solids. The slurry as it leaves the multiple effect evaporator still is flowable or pumpable. The mixture passes to a surge tank, where the mixture then is pumped to a suitable dryer, such as a drum dryer, Raymond-flash dryer, and the like. Thus, a solid product containing less than about ten percent water is obtained which can be packaged as desired and marketed as an animal feed supplement. As indicated hereinbefore, such product is marketed only on the basis of its food value, since all antibiotic activity has been destroyed.

Alternatively, the multiple effect evaporator can be replaced with a superdecanter or filter, which permits the return of supernatant or filtrate to the mixing tank. This procedure permits charging to the mixing tank only mycelial cake rather than a mixture of mycelial cake and spent beer.

The process of the present invention can be carried out using mycelial waste produced by a single microorganism. Alternatively, mycelial waste from several different microorganisms can be combined along with spent beers from several different manufacturing processes. The preferred source typically will be a combination of mycelial cakes from several different antibitoic manufacturing processes. However, the choice of mycelial cakes typically will be based upon availability and other considerations relative to the disposal of the mycelial waste produced from such processes.

The present invention is more fully described, without intending to limit it in any manner, by the following examples, in which all temperatures are expressed in degrees centigrade.

EXAMPLE 1

An autoclave was charged with a mixture of 208.2 ml. of tylosin spent beer, 42.1 g. tylosin mycelial cake, 173.4 ml. cephalosporin C spent beer, 66.9 g. cephalosporin C mycelial cake, 87.0 ml. penicillin V spent beer, and 17.8 g. penicillin V mycelial cake. The mixture was heated with agitation at 172° and at equilibrium pressure for 2.5 hours. The resulting slurry was concentrated by distillation at atmospheric pressure to a thick, pumpable slurry. The resulting slurry contained 29.1 percent solids, gave 11.5 percent ash, and consisted of 14.47 percent protein, based upon a Kjeldahl nitrogen analysis.

EXAMPLE 2

Tylosin mycelial cake, 100 g., was suspended in 300 ml. of tylosin spent beer. The slurry was charged to an electrically-heated autoclave. The mixture was heated to 170° over a period of 45 minutes, and held at 170° for 10 minutes at an equilibrium pressure of 95 p.s.i.g. The autoclave was allowed to cool to 35° over a period of 1.5 hours. The lyzed slurry was concentrated to a thick, pumpable slurry by distillation at atmospheric pressure. The resulting slurry contained 34.7 percent solids and gave 6.4 percent ash.

EXAMPLE 3

The procedure of Example 2 was repeated, except that the tylosin spent beer was replaced with an equal amount of water and the lysis was carried out for 1 hour at 200° and an equilibrium pressure of about 200° p.s.i.g. The final concentrated slurry contained 26.7 percent solids, 10.9 percent protein, and gave 3.43 percent ash.

EXAMPLE 4

Tylosin mycelial cake, 6.4 kg., containing about 24 percent solids, was suspended in 19.2 l. of water. The mixture was heated with agitation in an electrically-heated autoclave at 200° for 1 hour, at equilibrium pressure. The pH of the resulting lyzed slurry was 5.0. The slurry then was concentrated by distillation at atmospheric pressure to a thick, pumpable slurry. The final slurry contained 28.2 percent solids, 11.0 percent protein, and gave 3.8 percent ash. The bioassay by plate method of the resultig slurry indicated the presence of 2.0 micrograms/gram of antibiotic. A microscopic examination of the final slurry showed that thorough lysis of cells had been obtained.

EXAMPLE 5

The procedure of Example 2 was repeated, except that the mixture was heated at 122°, at which temperature the equilibrium pressure was 28 p.s.i.g., but which pressure was increased with introgen to 228 p.s.i.g. The mixture then was heated with agitation at 122° for 2.5 hours. The resulting concentrated slurry contained 20.6 percent solids and gave 3.8 percent ash.

EXAMPLE 6

Cephalosporin C mycelial cake, 4.7 kg., containing 34 percent solids, was suspended in 14.1 l. of water. The resulting mixture was heated in an autoclave with agitation at 200° and at an equilibrium pressure of 210 p.s.i.g. for 1.5 hours. The resulting, concentrated slurry contained 28.0 percent solids, 8.7 percent protein, and gave 14.9 percent ash. The bioassay by plate method showed less than 100 mcg. of antibiotic per gram; the bioautographic assay was negative.

EXAMPLE 7

The procedure of Example 2 was repeated, except that the mycelial cake was penicillin V cake containing about 18 percent solids, the amount of liquid was 400 ml. of water, and lysis was carried out at 150° at equilibrium pressure, i.e., 55 p.s.i.g., for 2.5 hours. The final concentrated slurry contained 14.4 percent solids, 5.0 percent protein, 1.03 percent crude fat, and gave 4.1 percent ash. Upon re-assay, the percent solids was 15.5 percent.

EXAMPLE 8

The procedure of Example 7 was repeated, except that the lysis was carried out at 160° and equilibrium pressure. The final concentrated slurry contained 16.6 percent solids, 9.4 percent protein, 0.4 percent crude fat, and gave 4.5 percent ash.

EXAMPLE 9

The procedure of Example 7 was repeated, except that the suspending liquid consisted of 250 ml. of penicillin V spent beer and 50 ml. of water, and the lysis was carried out at 200° and at an equilibrium pressure of 220 p.s.i.g. The final concentrated slurry contained 15.8 percent solids, 4.2 percent protein, and gave 4.5 percent ash. The bioassay by plate method was negative, indicating less than 1 mcg. of antibiotic per gram.

EXAMPLE 10

An autoclave was charged, with agitation, with 80 kg. of tylosin mycelial cake, 394 l. of tylosin spent beer, 127 kg. of cephalosporin C mycelial cake, 330 l. of cephalosporin C spent beer, 34 kg. of penicillin V mycelial cake, and 167 l. of penicillin V spent beer. The autoclave then was heated by steam under pressure to about 160° and at equilibrium pressure for 2.5 hours. The autoclave then was cooled to 90° and set up for atmospheric distillation. The resulting mixture was distilled under atmospheric pressure to a volume of about 300 l. The results of three runs were as follows:

|  | Percent Solids | Ash | Protein | Crude Fat |
|---|---|---|---|---|
| Run 1: | 25.5 percent | 10.4 percent | 7.25 percent | 13.7 percent |
| Run 2: | 25.2 percent | 10.6 percent | 7.1 percent | 12.6 percent |
| Run 3: | 25.3 percent | 9.7 percent | 6.7 percent | 16.7 percent |

A small portion of the product from Run 2 was further concentrated to a solids content of 36.8 percent. The equilibrium pressure in Run 1 was 90 p.s.i.g. at a temperature of 162°C. The equilibrium pressures in Runs 2 and 3 were each 95 p.s.i.g. The lysis temperature in Run 2 was 161° and the lysis temperature in Run 3 was 160°C. The distillate volumes in the three runs were 817 l., 860 l., and 700 l., respectively. In Run 3, the amount of tylosin spent beer was 285 l. and the amount of cephalosporin C spent beer was 275 l. In each case, the cephalosporin C bioautograph was negative.

What is claimed is:

1. A process for lysing mycelial waste obtained from the production of antibiotics, which comprises heating the mycelial waste at a temperature of from about 140° to about 200°C., at a pressure of from the equilibrium pressure to about 2,000 p.s.i.g., and at a pH of from about 2 to about 10, until substantially no antibiotic activity remains.

2. The process of claim 1, wherein the pressure is in the range of from equilibrium pressure to about 250 p.s.i.g.

3. The process of claim 1, wherein the pH is in the range of from about 5 to about 7.

4. The process of claim 1, wherein the temperature is in the range of from about 150° to about 200°C.

5. The process of claim 1, wherein the mycelial waste is obtained from the production of tylosin.

6. The process of claim 1, wherein the mycelial waste is obtained from the production of cephalosporin C.

7. The process of claim 1, wherein the mycelial waste is obtained from the production of penicillin V.

8. The process of claim 1, wherein the mycelial waste is the combined mycelial waste from the production of tylosin, cephalosporin C, and penicillin V.

* * * * *